(12) United States Patent
Fedders

(10) Patent No.: US 6,880,483 B2
(45) Date of Patent: Apr. 19, 2005

(54) ACTIVE SEAT SUSPENSION FOR WATERCRAFT

(75) Inventor: Brandon J. Fedders, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/361,146

(22) Filed: Feb. 7, 2003

(65) Prior Publication Data

US 2004/0154524 A1 Aug. 12, 2004

(51) Int. Cl.$^7$ .............................................. B63B 35/17
(52) U.S. Cl. ............... 114/363; 114/55.57; 267/140.11; 188/267.1; 188/267.2
(58) Field of Search ........................... 114/55.5, 55.55, 114/55.57, 343, 363; 267/113, 117, 120, 131, 140.11, 140.13, 140.14, 140.15; 188/267, 267.1, 267.2; 251/129.01, 129.09; 248/550, 560, 562, 636

(56) References Cited

U.S. PATENT DOCUMENTS

| | | | |
|---|---|---|---|
| 3,213,821 A | * 10/1965 | Godwin | 114/344 |
| 5,044,299 A | 9/1991 | Frank | |
| 5,277,281 A | * 1/1994 | Carlson et al. | 188/267 |
| 5,284,330 A | * 2/1994 | Carlson et al. | 267/140.14 |
| 5,367,978 A | * 11/1994 | Mardikian | 114/363 |
| 5,603,281 A | * 2/1997 | Harvey et al. | 114/363 |
| 5,639,059 A | 6/1997 | Nash | |
| 5,652,704 A | * 7/1997 | Catanzarite | 701/49 |
| 5,690,195 A | 11/1997 | Kruckemeyer et al. | |
| 5,706,919 A | 1/1998 | Kruckemeyer et al. | |
| 5,712,783 A | * 1/1998 | Catanzarite | 701/37 |
| 5,810,125 A | * 9/1998 | Gezari | 188/266.2 |
| 5,911,191 A | 6/1999 | Burer | |
| 6,042,093 A | 3/2000 | Garelick | |
| 6,152,062 A | 11/2000 | Hattori | |
| 6,158,470 A | * 12/2000 | Ivers et al. | 137/807 |
| 6,179,255 B1 | 1/2001 | Radford | |
| 6,182,590 B1 | 2/2001 | Patera | |
| 6,343,677 B1 | * 2/2002 | Bell | 188/315 |
| 6,386,635 B1 | 5/2002 | Ralph | |
| 6,422,360 B1 | * 7/2002 | Oliver et al. | 188/266.5 |
| 6,668,986 B1 | * 12/2003 | Moradmand et al. | 188/267 |
| 6,732,033 B1 | * 5/2004 | LaPlante et al. | 701/37 |
| 2002/0153647 A1 | 10/2002 | Baudendistel et al. | |

FOREIGN PATENT DOCUMENTS

| | | | | |
|---|---|---|---|---|
| JP | 04232134 A | * | 8/1992 | B60N/2/52 |
| JP | 10129321 A | * | 5/1998 | B60N/2/50 |
| JP | 2000038194 A | * | 2/2000 | B63B/29/12 |
| WO | WO 9212892 A1 | * | 8/1992 | B63B/17/00 |

* cited by examiner

Primary Examiner—S. Joseph Morano
Assistant Examiner—Ajay Vasudeva
(74) Attorney, Agent, or Firm—Michael D. Smith

(57) ABSTRACT

A watercraft seat suspension includes a damper mounted between a watercraft seat and the watercraft hull. The damper includes an electrically actuated mechanism controlling fluid flow from a first chamber to a second chamber within the damper. A sensor senses motion of the seat relative to the hull. A control unit interpolates the sensor signal and develops an actuating signal controlling the electrically actuated mechanism. In one arrangement, the electrically actuated mechanism is a solenoid actuated by the actuating signal to effect one of two different damping modes. In another arrangement, the electrically actuated mechanism includes a conductor coil and flux ring generating a magnetic field proportional to the actuating signal to vary the viscosity of magneto-rheological fluid in the damper.

23 Claims, 10 Drawing Sheets

ACTIVE SEAT SUSPENSION FOR WATERCRAFT

This invention relates generally to watercraft and, more particularly, to a shock absorbing or shock attenuating suspension system for a watercraft seat.

BACKGROUND

Power watercraft (boats) moving at speeds when impacting a wave, either natural or caused by another's boat wake, technically experience three forces about mutually octagonal axis. These forces are commonly referred to as "roll" which is a force about an axis which is in line with the direction that the boat is headed, "pitch" which is about an axis which is a line in the same plane as the roll axis but ninety degrees orthogonal to the roll axis, and "yaw" which is an axis along a line which is vertical to, or ninety degrees from, both the pitch and roll axis.

In a traditional vessel, boat, cabin cruiser, etc., application, the operator of the watercraft is jarred substantially, even during mild seas. Standing while operating the vessel in such situations is practically impossible and the operator must be seated to avoid being thrown around uncontrollably.

Additionally, personal watercraft (PWC), defined herein as any low profile watercraft, have become popular. A PWC is a watercraft that is sporting in nature, turns swiftly, maneuvers easily and accelerates quickly. Typically, it carries one or two riders. Riders often experience noticeable vibrations, shocks and bumps as the relatively light-weight, small hull travels quickly across a body of water. These jarring movements are acerbated as the watercraft meets waves and wakes on the water. The resultant rough ride contributes to rider fatigue. Also, many riders jump their watercraft off of wakes and waves. The landing, however, severely jars the rider, especially if the watercraft lands bow first. The rider conventionally must absorb all of the impact by using his or her legs and arms.

A) Watercraft Suspension.

The prior art has recognized the need to address the safety, comfort and fatigue requirements of watercraft occupants. A number of seat suspension systems have been designed to address the needs discussed above.

In conventional watercraft, a number of suspensions for captain's seats have been developed. Reference can be had to U.S. Pat. No. 6,386,635 to Ralph, issued May 14, 2002, entitled "Shock Absorbing Boat Seat Assembly"; U.S. Pat. No. 5,044,299 to Frank, issued Sep. 3, 1991, entitled "Seat Construction for a Boat"; U.S. Pat. No. 5,639,059 to Nash, issued Jun. 17, 1997, entitled "Support for a Seat"; and, U.S. Pat. No. 5,911,191 to Burer, issued Jun. 15, 1999, entitled "Shock Absorbing Seat Pedestal," all of which illustrate modifications to the pedestal on which the captain's seat rests to allow vertical pedestal movement. Typically, a seat pedestal, as a stand alone item, is mounted to the boat's deck and a captain's seat, as a stand alone item, is mounted to the pedestal. Mechanisms in the pedestal allow for height adjustment and mechanisms in the seat and/or pedestal allow for seat swivelling and swivel lock out. More particularly, in the mentioned patents, a spring biased, conventional shock absorber is mounted in a modified seat pedestal permitting a telescoping tubular movement for damping vertical forces imparted to the vessel's hull. Additionally, arrangements within the modified pedestal are made for damping lateral forces. For example, resistant material is disposed between the tubes in the '191 patent. For a lateral damping pedestal seat, see U.S. Pat. No. 6,179,255 to Radford, issued Jan. 30, 2001, entitled "Seat Mounting Assembly." Additionally, see U.S. Pat. No. 6,042,093 to Garelick, issued Mar. 28, 2000, entitled "Boat Seat Shock Absorber," for a description of a rubber isolator fitted into a pivoted clamshell for attachment between an existing pedestal and the captain's seat. All of the captain's seat arrangements discussed are passive. They are adjustable to the extent that hydraulic shock absorbers are known to be adjustable.

The suspension seat arrangements for PWC's generally use a hinged seat with the pivot adjacent one end of the seat and a shock absorber adjacent the other seat end. See for example, U.S. Pat. No. 5,603,281 to Harvey et al., issued Feb. 18, 1997, entitled "Watercraft Seat Suspension"; U.S. Pat. No. 6,182,590 to Patera, issued Feb. 6, 2001, entitled "Personal Watercraft Suspension System"; U.S. Pat. No. 6,152,062 to Hattori, issued Nov. 28, 2000, entitled "Small Watercraft with Improved Suspension System"; and, U.S. Pat. No. 5,367,978 to Mardikian, issued Nov. 29, 1994, entitled "Shock-Absorber Mounted Seat for Personal Watercraft and Boats." In the '062 patent, the seat and a support frame carrying the seat are mounted to a three point, telescoping tube arrangement. In the '590 patent, an inflatable tube is mounted between seat and hull with the inflation pressure set at a desired level. All of the arrangements discussed are passive with the possible exception of one embodiment illustrated in the '978 patent. The '978 patent illustrates a possible solution to the sprung mass problem affecting PWCs where the weight changes from one to two passengers, but the shock absorber is tuned for one passenger. The '978 patent uses an air bag or air filled shock absorber powered by an electric pump to allow the air pressure of the shock to change for the sprung mass of the people carried by the PWC. Once changed, the system is passive as in the '590 patent.

In summary, the seats and/or seat suspensions employed in watercraft do use dampers, but the dampers are passive and do not have the ability to automatically adjust to the widely variant loads imposed on the seat in watercraft applications. That is, the hydraulic and pneumatic shock absorbers have fixed orifices through which fluid flows. The restriction in fluid flow caused by the orifice produces a damping force which is fixed for any set force applied to the shock, i.e., passive. If the shock is "tunable," the shock orifice/flow arrangement is adjustable (within certain limits). However, once the shock's new flow arrangement is set, the damping force is also fixed. The typical passive shock absorber does not have the ability to sense a movement (resulting from an applied force) and change the valving of the shock, i.e., an active shock. Additionally, there are space limitations present in many watercraft installations which, in turn, affect the ability of conventional shock absorbers to provide an effective damper over the travel range of the dampers. Further, while air suspensions have been suggested to account for the different sprung masses to which the PWC seat may be exposed, an external source of fluid, i.e., air pump, has to be provided and the damper curve for air shocks is limited.

B) M-R Dampers.

Generally, dampers utilize fluids for controlling the relative movement of the mechanical parts. For example, hydraulic fluid may be utilized as a medium for creating damping forces, or torques, or controlling motion, shock and vibrations. One class of such movement control devices utilizes a fluid medium which has characteristics which are controllable through the use of magnetic fields and/or magnetic flux and the present invention relates to this class of control devices. Such magnetically controlled fluid is referred to as magneto-rheological, or M-R, fluid and is comprised of small, soft magnetic particles dispersed within a liquid carrier. The particles are often generally round, and the suitable liquid carrier fluids include hydraulic oils and the like for suspending the particles. M-R fluids exhibit a thickening behavior (a rheology change), often referred to as "apparent viscosity change," upon being exposed to magnetic fields of sufficient strength. The higher the magnetic field strength to which the M-R fluid is exposed, the higher the flow restriction or damping force that can be achieved in the M-R device, and vice-versa. That is, the flow properties of M-R fluids may be selectively altered by magnetic fields.

A typical M-R damping device, for example, utilizes an iron core structure disposed within or surrounded by a metal cylinder or casing. M-R fluid is positioned to flow between the core and the metal cylinder. The damping effect of the device is due to the relative movement of the core and cylinder with respect to the M-R fluid or vice-versa. That is, depending upon the use and structure of the M-R damping device, the core and cylinder are dynamic and move through the M-R fluid or the M-R fluid moves between a stationary core and cylinder. To control the damping effects of the device, a magnetic flux is formed in and around the core and the metal cylinder, such that the core and cylinder create a magnetic circuit. The metal cylinder or casing surrounding the core is often referred to as a "flux ring" as it directs and provides a path for the magnetic flux which exists in and around the core. Variation of the flux in the device affects the flow of the M-R fluid between and around the core and flux ring and thus allows variation of the damping effects of the M-R device.

More specifically, during operation of the damping device, the M-R fluid flows through a restricted passage or gap formed between the flux ring and the core. Magnetic flux exists within the gap, and therefore, the characteristics of the M-R fluid flow through the gap are magnetically controlled by controlling the magnetic flux. By controlling the characteristics of the M-R fluid flow, the movement of the core and flux ring relative to the fluid is controlled, thus creating a damping effect to the physical structures which are operably coupled to the M-R damping device. To form and vary the magnetic flux in and around the core and within the gap between the core and the flux ring, a magnetic field generator, such as a wire coil, is wound around the core. The magnetic flux in the core and in the fluid passage is varied by variation of the electrical current through the coil. The selectively variable magnetic flux dictates the characteristics of the fluid flow in the restricted passage. The relative movement between any mechanical parts and the damping of that movement is then regulated by controlling the characteristics of the fluid flow.

When constructing and assembling a typical M-R damping device as described above, the core and the wire coil, which is wound around the core, are formed with an insulative material. The material, which may be an insulative plastic material, is molded flush around the coil to protect the coil form the M-R fluid. Thereafter, the flux ring, or other metal casing surrounding the core and coil, is placed around the core and coil.

It is to be appreciated that the magnetic field changes instantaneously and the apparent viscosity and the shear resistance of the M-R fluid will change accordingly, i.e., within fractions of a millisecond. Accordingly, as disclosed in assignee's United States patent publication No. 2002/0153647 A1 to Baudendistel et al., published Oct. 24, 2002, entitled "Hydraulic Mount and Control Method," there is disclosed a control system sensing pressure of the M-R fluid in one of the shock absorber chambers. The sensed pressure is then utilized by a controller vis-a-vis an algorithm to vary the magnetic flux and "apparent viscosity" of the M-R fluid in the gap to produce a desired damping force. The damping force is directly determined by the instantaneous external force imposed on the damper causing the sensed pressure in the damper's chamber. The damper is thus active because the damping force is determined by the external force applied to the damper.

C) Hydraulic Dampers.

Still further, the assignee of the subject invention has developed hydraulic dampers for motor mounts and automotive suspensions which are active dampers. As is well known in the hydraulic damper art, damper orifices are sized so that the damper is tuned to provide damping forces to null out vibration frequencies within set ranges. Motor mounts are exposed to widely different force frequencies. Automotive suspensions are frequently subjected to driving conditions requiring a firm or soft suspension. The assignee has developed hydraulic damping systems which sense applied forces and in response to the sensed force, adjusts the effective orifice size of the hydraulic damper so that the damper is tuned to damping frequencies typically falling within one of two ranges. The damper is active because it is tuned to a frequency range corresponding to the actual forces experienced by the motor mount. Reference can be had to U.S. Pat. No. 5,690,195 to Kruckemeyer et al., issued Nov. 25, 1997, entitled "Alternating State Pressure Regulation Valved Damper", and U.S. Pat. No. 5,706,919 to Kruckemeyer et al., issued Jan. 13, 1998, entitled "Alternating State Pressure Regulation Valved Damper", for examples of two-stage dampers.

SUMMARY OF THE INVENTION

Accordingly, it is a general aspect of the invention to provide a seat suspension damper for watercraft which is active so as to provide a variable cushioned or damping force which counteracts the many varied forces otherwise experienced by the occupant of a seat in a watercraft.

A general aspect of the invention is the provision of an active seat suspension system for watercraft in which a fluid damper is mounted between a first support connected (directly or indirectly) to the watercraft hull and a second support connected (directly or indirectly) to the watercraft's seat. The fluid damper has a first chamber adjacent one of the supports and a second chamber adjacent the other support with an internal member having a gap between the chambers. The damper is provided with an electrically actuated mechanism which varies flow of damper fluid through the gap in response to electrical control signals generated by the system's control unit. The system additionally includes at least one sensor for measuring a physical characteristic resulting from a force imposed on the seat producing seat motion and generating a sensor signal indicative of seat motion, a power supply and a control unit connected to the power supply, the sensor(s) and the electrically actuated mechanism. The control unit generates control signals in response to sensor measurements whereby variable damping of the seat occurs as a result of motion of the watercraft and forces imparted to the hull of the watercraft by water.

In one embodiment of the invention, the mechanism for varying the flow of damper fluid is a coil for generating a magnetic field in and adjacent the gap and the damper fluid is magnetic-rheological fluid. The electrical signals generated by the control unit cause the coil to emit set magnetic fields producing set apparent viscosities in the M-R fluid which are matched to the forces experienced by the seat occupant and producing seat motion.

In another embodiment of the invention, the mechanism for varying the flow of damper fluid is a solenoid which when actuated by the control unit causes a plunger to either move into or out of the gap. The damper fluid, conventional hydraulic fluid, flows from one chamber to the other either through a long path of a set area when the plunger blocks the gap or through an effective short path of a larger set area when the plunger is retracted from the gap. The flow path/area determines the damping rate and the solenoid is actuated or unactauted by the control unit acting in response to the sensor signal to provide an active suspension system.

In accordance with another general aspect of the invention, the sensor can be any type of sensor measuring one or more of the following physical characteristics to determine the damper resistance to be applied to movement of the seat: a) position (at any clocked time), b) velocity, c) acceleration, d) pressure and e) the sprung mass or weight of an occupied seat. In accordance with a preferred embodiment of the invention, a single sensor indicative of the vertical motion of the seat imparted by the sprung weight of an occupied seat is sufficient to account for forces attributed to roll, pitch and yaw on the seat, especially when the damper is a single, uni-directional damper oriented in a vertical direction whereby the cost of the suspension is minimized. In more sophisticated applications where several active seat dampers may be employed, several sensors may be optionally employed and/or lateral force sensors additionally employed to provide a more sensitive system that can better maintain the position of the seat occupant's center of gravity.

In accordance with yet another aspect of the invention the suspension preferably comprises a single damper fitted within a telescoping tube arrangement in a pedestal positioned directly beneath the seat or to a hinged seat where rotation of a seat about a pivot point is resisted by the damper. In accordance with another aspect of the invention, the boat seat and particularly, the pedestal for the seat, may alternatively simply comprise a conventional automotive type active twin tube strut modified for mounting to the boat hull and boat seat.

Alternatively, the invention contemplates multiple active dampers for a more stable, secure suspension. For example, a PWC may have the seat mounted in a removable frame carrying occupant(s) and secured to the hull by several spring biased dampers. Alternatively, a retrofit active suspension kit for a captain's chair may be provided comprising a top and bottom plate assembly inserted between a conventional pedestal captain's seat and a conventional seat assembly with an active damper(s) or isolator(s) secured to and fastening the top and bottom plates together. When a plurality of spaced active isolators are provided, each isolator may have its own sensor so that the positioning of the isolators form a resultant damper sensitive to lateral as well as vertical loading. Alternatively, a central sensor arrangement can be positioned within the assembly for sensing lateral and vertical forces with the control unit variably controlling each damper. In each instance, the damping by each isolator may vary from one active isolator to the other to provide a damped seat responsive to pitch, roll and yaw forces being experienced by the watercraft seat occupant(s).

In accordance with another aspect or the invention, the controller or control unit may be optionally equipped with a user switch or dial either directly or remotely mounted, allowing the seat occupant to establish a desired damper firmness. In the inventive M-R damper embodiment, the magnetic flux is typically established as a function of the current waveform in the coil. The current waveform is established by the controller using code resulting from known algorithms, preferably code implementing algorithms utilized in M-R vehicular applications. The code typically adjusts for the sensed sprung weight of the occupant. The user can be given the option of manually setting the control unit to provide a firm-soft damper resistance.

It is thus a general object of the invention to provide a watercraft seat suspension which gives improved stability, comfort and/or safety to the seat occupant.

It is another objective of the invention to provide a watercraft suspension system which provide a smooth ride to the boat occupants substantially free from jarring blows to the watercraft's hull caused by wakes and rough water. Importantly, the system can also control the heave of the riders and help prevent personal injury from being thrown off the seat.

Another general objective of the invention is to provide a watercraft suspension which automatically adjusts for changes in riding condition, sprung mass and number of passengers.

Additional advantages and features of the invention include the fact that the damper can be readily fitted into existing suspension systems and/or can be instrumented to provide inputs indicative of the force conditions affecting watercraft with fractional micro second damper adjustments for such forces, all in a closed but active environment; and/or adjustable, in the active sense, by the user simply toggling a switch or dial and/or utilized in confined installation spaces where the stroke of the damper is limited.

These and other features and advantages of the invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and arrangement of parts taken together and in conjunction with the attached drawings which form a part of the invention and wherein:

FIG. 7 is a sectioned elevation view of an active, M-R twin tube strut modified to function as a pedestal for a captain's seat and the like;

DETAILED DESCRIPTION OF THE INVENTION

Figure 1:
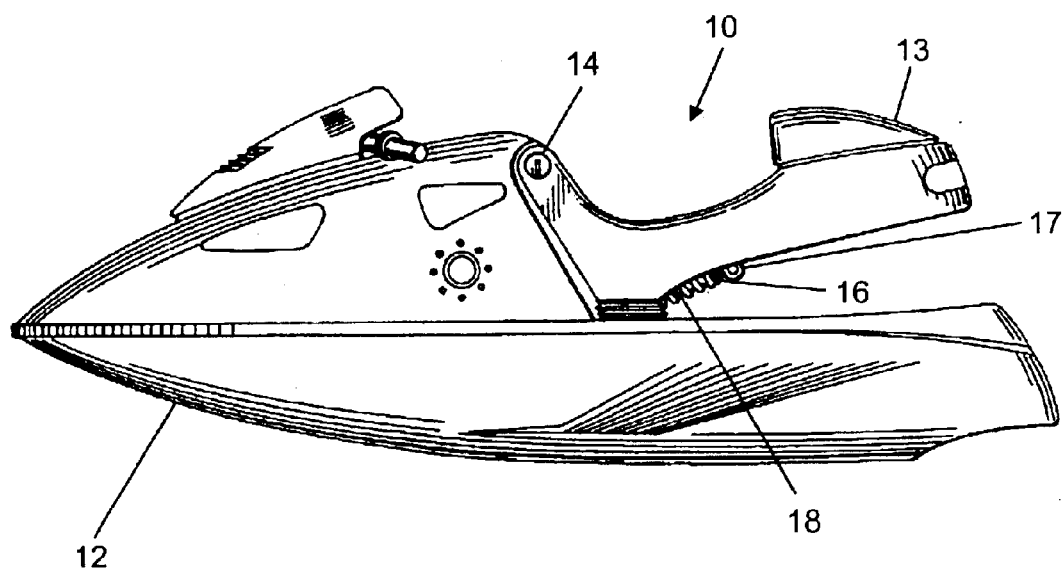
FIGS. 1 and 2 are pictorial views of personal watercraft illustrating different seat suspension concepts.

Referring now to the drawings wherein the showings are for the purpose of illustrating preferred and alternative embodiments of the invention only and not for the purpose of limiting the same, there is shown in FIG. 1 a depiction of a personal watercraft 10. Personal watercraft is used herein in accordance with its customary meaning, namely, a vessel using an inboard motor powering a jet pump as its primary source of motor power and which is designed to be operated by a person sitting or kneeling on the vessel rather than the conventional manner of sitting or standing inside the vessel.

In the embodiment of the invention disclosed in FIG. 1, personal watercraft 10 has a hull 12 usually made of fibreglass and a seat 13 shown as an elongated streamlined body. In this embodiment, seat 13 is pivotally mounted to hull 12 substantially at the front end of seat 13 by means of a pivot pin 14. This pivot arrangement mounts seat 13 to hull 12 in a cantilever fashion to permit up and down motion of seat 13 relative to hull 12. Mounted adjacent to the end of seat 13 opposite pivot 14 is a shock absorber or damper 16. One end 17 of damper 16 is secured to seat 13 and the opposite end of damper 16 is secured to hull 12 (not shown in FIG. 1) in a conventional automotive-type monotube shock absorber mounting. Damper 16 is provided with a spring 18 to exert a biasing force maintaining seat 13 in its "at rest" position shown in FIG. 1. Damper 16 is mounted relative to seat 13 at such an angle that damper 16 is substantially aligned with the direction of movement which the cantilever mounted seat 13 undergoes as it oscillates relative to its resting position. Reference can be had to U.S. Pat. No. 5,367,978 to Mardikian (incorporated by reference herein) for a more detailed explanation of how damper 16 is mounted to seat 13 and hull 12 than that disclosed herein.

Figure 2:
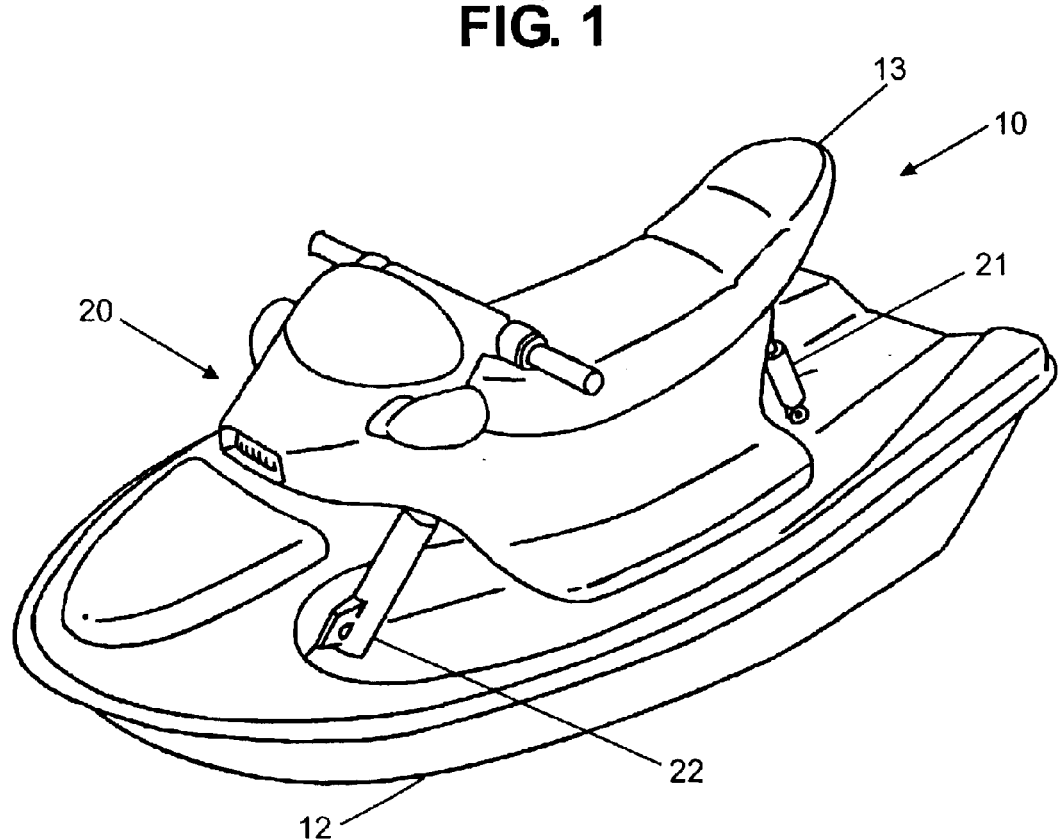

Referring now to the personal watercraft embodiment illustrated in FIG. 2, there is shown an arrangement where seat 13 is carried by a seat frame 20 which, in turn, is mounted to hull 12 by means of three shock absorbers or dampers arranged in a tripod fashion. The rear leg of the tripod is shown as rear damper 21 and one of the front legs of the tripod arrangement is shown as front damper 22 in FIG. 2. Rear damper 21 acts in a somewhat cantilevered fashion not entirely dissimilar to the arrangement illustrated in FIG. 1 and the dampers are spring biased to maintain seat frame 20 in its "at rest" position. Reference can be had to U.S. Pat. No. 6,152,062 to Hattori (incorporated by reference herein) for a more detailed explanation of the seat frame and its mounting arrangement than that disclosed herein.

Figure 3:
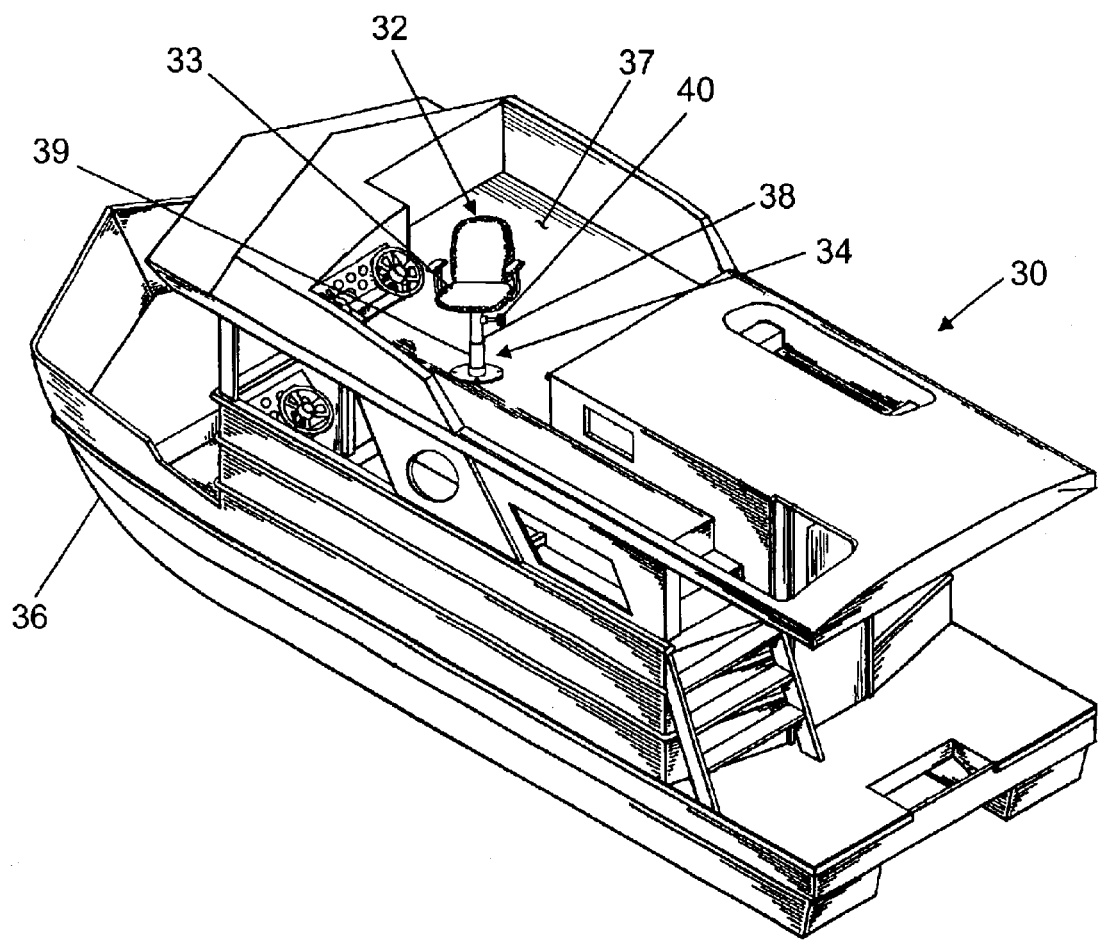
FIG. 3 is a pictorial view of a boat equipped with a captain's seat having a telescoping pedestal.

Referring now to FIG. 3 there is illustrated a boat, vessel or watercraft 30 having a captain's chair 32. For consistency in terminology, a captain's chair will be defined to include a captain's seat 33 and a pedestal 34. Typically, captain's seat 33 is supplied as a separate item mounted to a standard type of pedestal 34 which, in turn, is connected to a hull 36 of boat 30 either directly or indirectly by means of a deck structure 37. However, captain's chair 32 can be supplied with seat 33 and pedestal 34 as an integral structure. Also, as a matter of definition, it is to be understood that captain's chair 32 includes not only a single person seat as illustrated in FIG. 3, but also benches and the like, in which instance, "seat" means the cushion or structure in contact with the occupant and "pedestal" means the structure connected directly or indirectly to the hull and to the seat. In pedestals involving one embodiment of the invention, an inner tube 38 is telescopically received within an outer tube 39 (or vise-versa) and a spring within the pedestal biases the tubes so that one tube telescopes out from the other. Pedestal 34 is generally provided with a seat control knob 40 allowing the occupant to adjust the spring bias (and height) of seat 33. An additional control (not shown) is also provided to lock seat 33 in any desired swivel position. Seat and/or pedestal structures which permit the seat to rotate or swivel to a desired position and be locked or to be raised and lowered to desired positions are well known in the prior art and will not be shown or described in detail herein. The inventive suspension system discussed herein does not modify or alter such structure.

Figure 4:
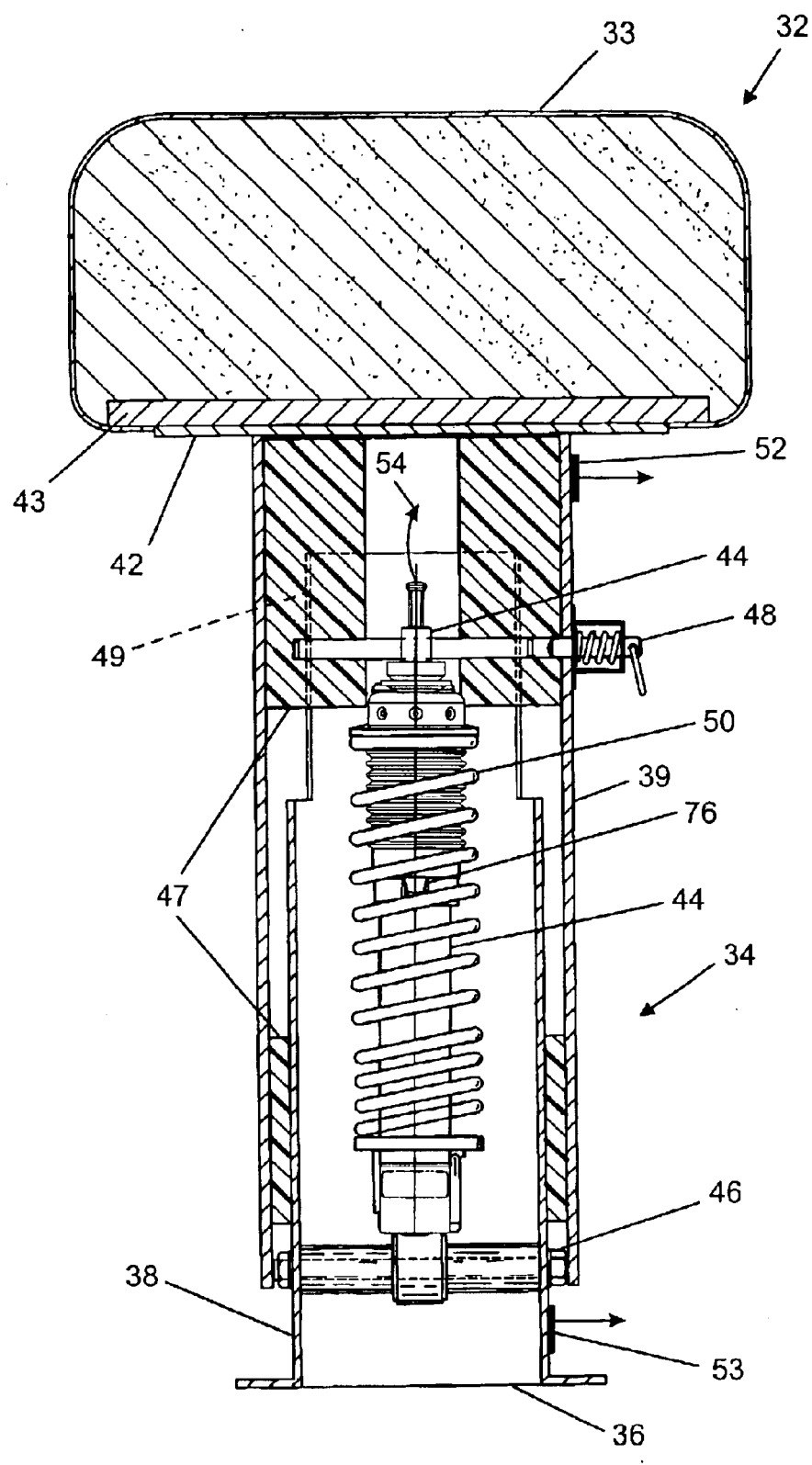
FIG. 4 is a partially sectioned elevation view of a telescoping captain's seat modified to incorporate an active damper.

Referring now to FIG. 4, there is shown an embodiment of the captain's chair depicted in FIG. 3 and reference numerals used in describing captain's chair 32 in FIG. 3 will likewise be used in describing the captain's chair depicted in FIG. 4. In this embodiment, inner tube 38 is mounted to hull 36 and outer tube 39 is mounted by a pedestal plate 42 to a seat plate 43. Thus, outer tube 39 telescopically moves in and out of inner tube 38. Mounted within inner tube 38 is an active, monotube M-R damper 44. One end of M-R damper 44 is secured to inner tube 38 by means of a bottom bolt 46. The opposite end of M-R damper 44 or piston rod tenon 45 is drilled to receive a latch pin 48 which secures the piston rod to outer tube 39. Inner tube 38 is slotted as indicated by reference numeral 49 to permit movement of latch pin 48 (and piston rod tennon 46) relative to inner tube 38. Reference can be had to U.S. Pat. No. 5,911,191 to Burer issued Jun. 15, 1999 (incorporated by reference herein) for a more detailed description of how latch pin 48 is mounted to the slotted tube. In the embodiment of FIG. 4, there is resilient material indicated by reference numeral 47 provided for the purpose of cushioning lateral forces. While this cushioning feature can be used in telescoping pedestal arrangements which do not securely mount the damper, M-R damper 44 has sufficient structural integrity in its piston, piston rod and tube to withstand lateral forces experienced by the occupant in water craft applications and is not necessary.

An adjustable damper spring 50 provides spring bias maintaining captain's chair 32 in its "at rest" position as illustrated in FIG. 4 as well as a biasing force resisting downward movement of seat 33. In the embodiment illustrated in FIG. 4, a first position sensor 52 is mounted to outer tube 39 and a second position sensor 53 is mounted to inner tube 38. Coil leads from M-R damper 44 are indicated by the arrow designated as reference numeral 54. It is appreciated that velocity, acceleration, pressure, etc., sensors can be mounted in place of the position sensors shown.

Figures 5, 6A, 6B:
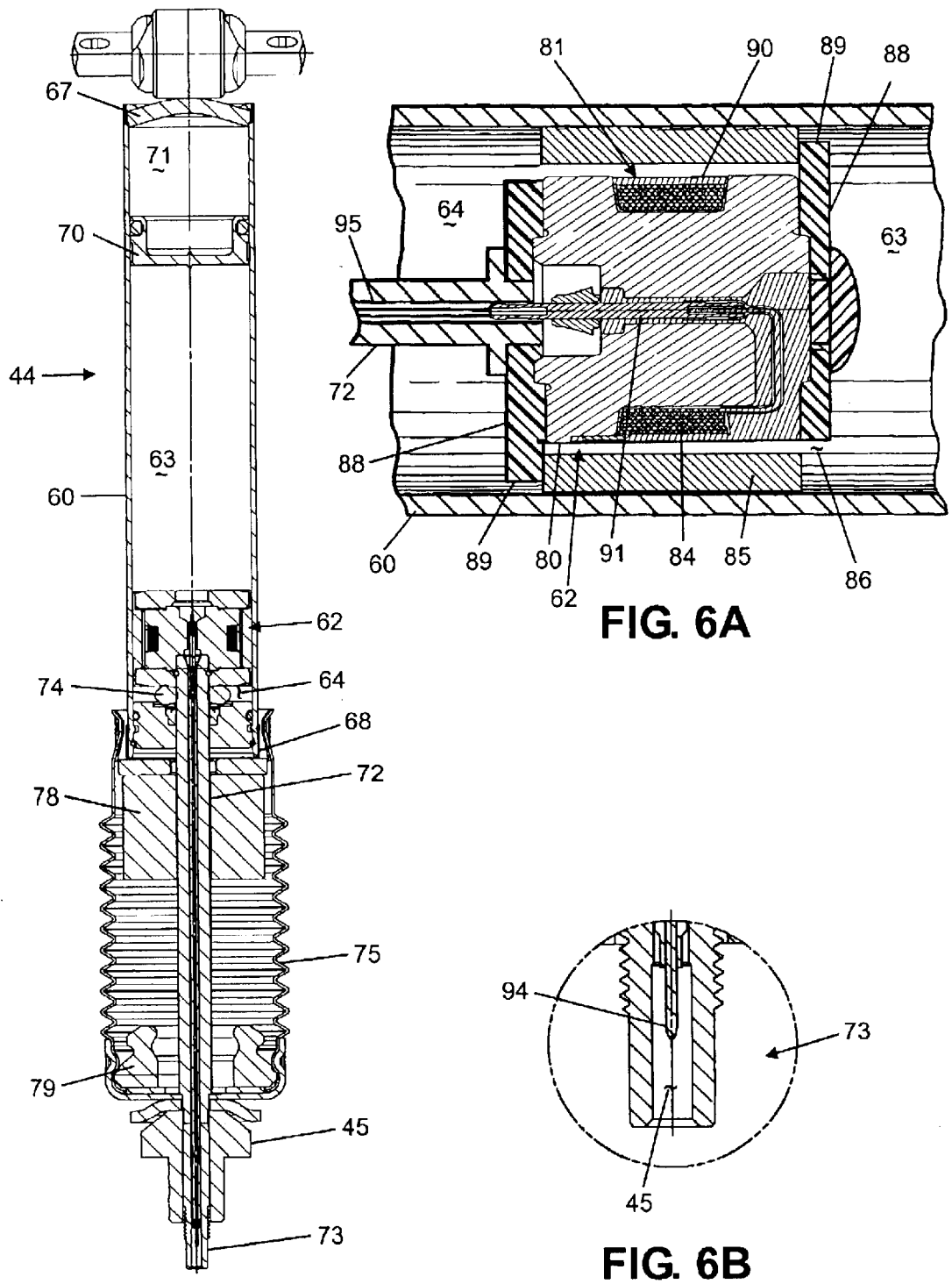
FIG. 5 is a sectioned elevation view of a monotube active damper of the type shown in FIG. 4.
FIGS. 6A and 6B illustrate details of the damper shown in FIG. 5.

Referring now to FIG. 5, there is shown a longitudinally sectioned view of M-R damper 44 shown in FIG. 4 which is a conventional M-R monotube and will only be generally described. M-R damper 44 includes a hollow tube 60 within which is a slidable piston assembly 62 dividing hollow tube 60 into a first chamber 63 on one side of piston assembly 62 and a second chamber 64 on the opposite side of piston assembly 62. Hollow tube 60 is sealed at one end by first end cap 67 and at its opposite end by second end cap 68. A floating sealed gas cap 70 within tube 60 between first end cap 67 and piston assembly 62 separates M-R fluid in first chamber 63 from a cavity 71 filled with a pressurized inert gas. Floating gas cap 70 accommodates displacement of M-R fluid due to the varying length of a piston rod 72 mounted to piston assembly 62 extending sealingly and slidable out of second end cap 68. In first chamber 63, between second end cap 68 and piston assembly 62 is a rebound bumper 74. A bellows dust cap 75 is fixed at rod tenon 45 adjacent a distal end 73 of piston rod 72 and secured to tube 60 as by clamp 76 (FIG. 4). Bumpers 78, 79 within dust cap 75 provide a solid stop limiting travel of piston rod 72.

Referring now to FIG. 6A, piston assembly 62 includes a piston core 80 and a magnet assembly 81. Magnet assembly 81 includes a coil 84 (producing pole pieces in piston core 80 on opposite axial sides thereof when energized) and an annular flux ring 85 extending around the circumference of piston core 80 and defining an annular flow gap 86 positioned between flux ring 85 and piston core 80.

Optionally, a bearing ring (not shown) can be inserted at an axial end extending from the outer circumference of flux ring 85 in contact with the ID (inside diameter) of tube 60 to provide a positive seal between the OD (outside diameter) of flux ring 85 and tube 60. In this embodiment, first and second chambers 63, 64 are filled with any conventional M-R fluid. It is believed that M-R fluid specifically developed for automotive applications such as a carbonyl iron powder suspended in a synthetic hydrocarbon oil is preferred. Ferrous micro particles usually have a spherical or near spherical geometry in a size distribution ranging from about 1 um to about 25 um, usually from about 1 um to about 6 um.

Piston assembly 62 additionally includes non-magnetic end plates 88 positioned at each axial end of piston core 80 and secured thereto by any conventional means (such as by welding or as shown by fastening). Flux ring 85 is effectively secured against movement relative to piston core 80 so as to precisely form and maintain a desired radial width or thickness of flow gap 86 thereby providing predictable control of the damping effect. Each end plate 88 can include several radial extensions 89 angularly spaced around the circumference of end plate 88 for connection to flux ring 85. Note that the outside diameter of each end plate 88 is not greater than the OD of piston core 80 except for the flow areas covered by radial end plate extensions 89 thus permitting substantially unimpeded flow of M-R fluid through flow gap 86.

Coil 84 is typically wound as a solenoid coil about the outer periphery of piston core 80 and insulated within piston core 80, typically by over mold as indicated by reference numeral 90. Coil leads extend to a brass conductor 91 which establish electrical contact with terminals 94 extending through a central passageway 95 formed in piston rod 72. Terminals 94 are formed as pin terminals at distal end 73 of piston rod 72 as shown in FIG. 6B for connection to a controller 100 to be described further below.

As is well known, coil 84 comprises multiple conductors capable of receiving and circulating an electrical current. By Amperes Law, the flow of electrical current in coil 84 generates an applied magnetic field directed across gap 86 between piston core 80 and flux ring 85. The strength of the magnetic field in gap 86 is proportional to the magnitude of the electric current flowing in coil 84. In response to a force induced movement on piston rod 72, M-R fluid will flow between first and second chambers 63, 64 through flow gap 86. When coil 84 is energized, the effective or apparent viscosity of the M-R fluid in flow gap 86 is increased by the interaction of the micro particles with the applied magnetic field. Variations in the electrical current flowing to coil 84 can be used to modulate the strength of the applied magnetic field and thereby to control the apparent or effective viscosity of the flowing M-R fluid. Modulation of the apparent viscosity affects the rate of flow of the M-R fluid through gap 86 to achieve a desired damping affect.

Figure 7:
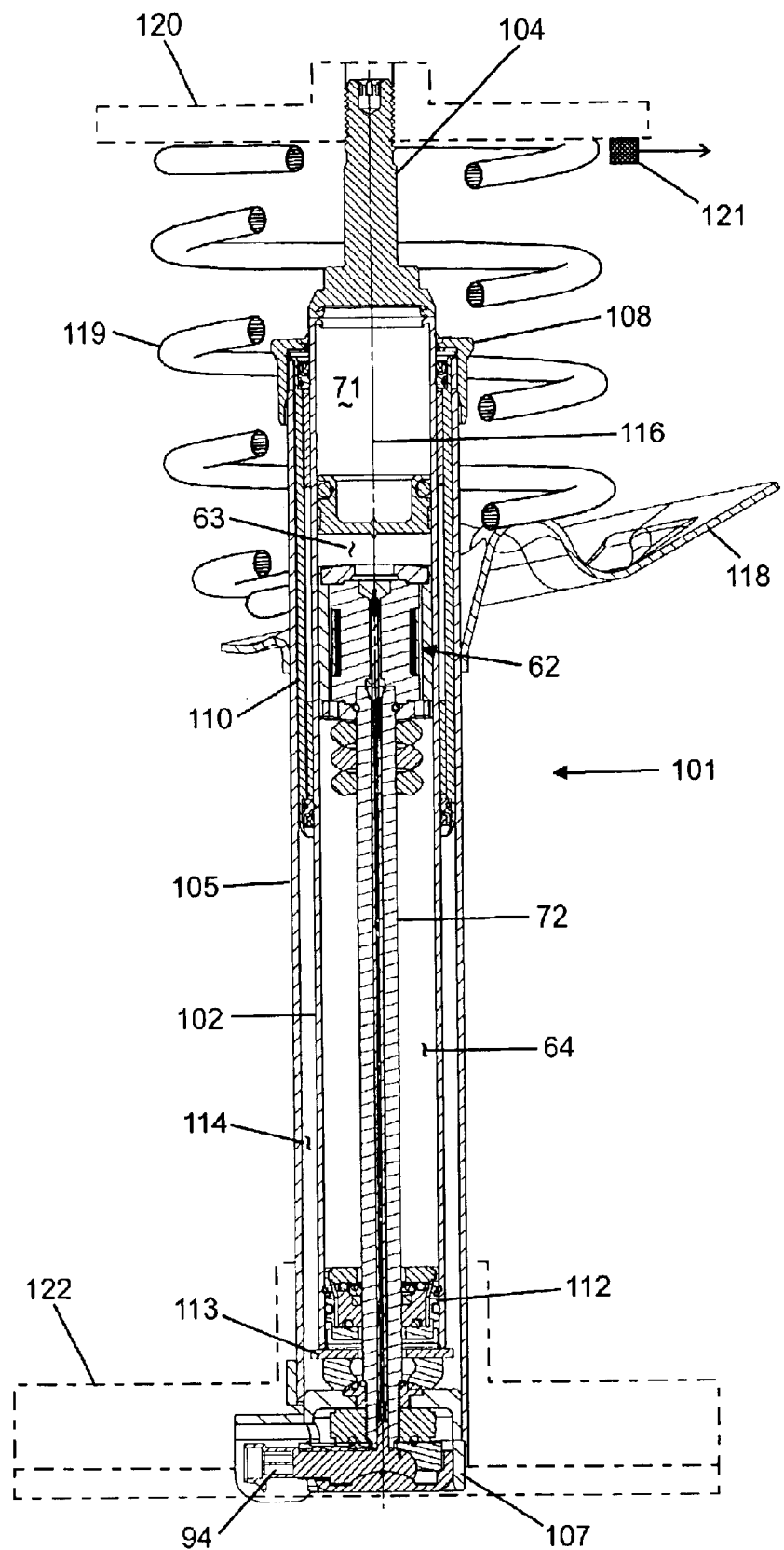

An alternative embodiment well suited for watercraft application is an active twin tube damper/strut 101 illustrated in FIG. 7 hereof. Strut 101 utilizes M-R fluid and has similar components to M-R damper 44 illustrated in FIGS. 5 and 6A. Accordingly, where applicable, reference numerals used in describing M-R damper 44 will also apply, where applicable, to M-R strut/damper 101.

Strut 101 includes an inner tube 102 having a rod tenon 104 formed at a protruding end thereof. Inner tube 102 is telescopically disposed within an outer tube 105. Fixed to the bottom end of outer tube 105 shown in FIG. 7 is a terminal block assembly 107 which seals the bottom end of outer tube 105. Pin terminals 94 extend from terminal block assembly for connection to controller 100. Also secured to terminal block assembly 107 is piston rod 72 which is secured at its opposite end to piston assembly 62 which is configured and functions as described with reference to FIG. 6A. A bump stop 108 is formed/crimped about the opposite end of outer tube 105 and an intermediate tubular arrangement 110 in the annular space between inner and outer tubes 102, 105 and extending from bump stop 108 seals the annular space between inner and outer tubes 102, 105 allowing telescopic movement of inner tube 102 relative to outer tube 105. At the bottom of piston rod 72 is a base valve 112 which seals in a known manner against a base seat 113 secured to terminal block assembly 107. In this embodiment, piston assembly 62 functions as a piston valve dividing the volume of inner tube 102 into a rebound chamber, defined as first chamber 63, extending on one side of piston assembly 62 and a compression chamber, defined as second chamber 64 in the FIG. 5 embodiment, extending on the opposite side of piston assembly 62. Base valve 112 divides strut 101 into compression chamber 64 on one side of base valve 112 and a compensating or reservoir chamber 114 extending on the opposite side of base valve 112 and includes the annular space between inner and outer tubes 102, 105. Rebound and compression chambers 63, 64 are substantially full of M-R fluid to damp reciprocating movements of inner tube 102 along the struts' longitudinal axis 116. Reservoir chamber 114, which is similarly filled with M-R fluid acts as a reservoir for fluid in rebound and compression chambers 63, 64. Note, gas filled cavity 71 functions as a compensating space for M-R fluid displacement. As described, damper/strut 101 is conventional (as is M-R damper 44), and piston assembly 62 will function in the same manner as described for M-R damper 44 so its operation will not be repeated. As is well known, base valve 112 primarily controls the compression characteristics of damper/strut 101 while piston assembly 62 primarily controls the rebound characteristics of base valve 112.

In a typical strut application, a spring base 118 is fixed to outer tube 105 and functions as a base or seat for one end of a compression spring 119. In a captain's chair watercraft application, a pedestal plate, shown in dash-line by reference numeral 120, is attached to the threaded end of rod tenon 104 and functions as a base or seat for the opposite end of compression spring 119. Conventionally, mounted to pedestal plate 120 is the captain's seat. Pre-compression of spring 119 can be established by rotating pedestal plate 120 along the threaded axis of rod tenon 104. Other known seat/pedestal mounting arrangements can be employed. For example, the pedestal plate could be mounted on rod tenon 104 with a lockable bearing arrangement permitting seat swivelling and also spring adjustment. Fixed to the bottom end of outer tube 105 as by welding, is a pedestal base shown by dash-lines indicated by reference numeral 122. Pedestal base 122 is affixed to the hull of the watercraft in any conventional manner. Thus, in this embodiment of the invention, a conventional M-R damper/strut can be readily modified to function as the pedestal base of a captain's chair to provide active damping. For personal watercraft application of this embodiment, conventional shock absorber mounting structures would be attached to the end of pedestal plate 120 and to the bottom end of outer tube 105 in lieu of pedestal base 122. In the FIG. 7 embodiment, a velocity or accelerometer sensor 121 can be placed on pedestal plate 120, or alternatively, on outside tube 105 to measure rate of change movement in the captain's seat relative to the hull of the boat.

Figure 8:
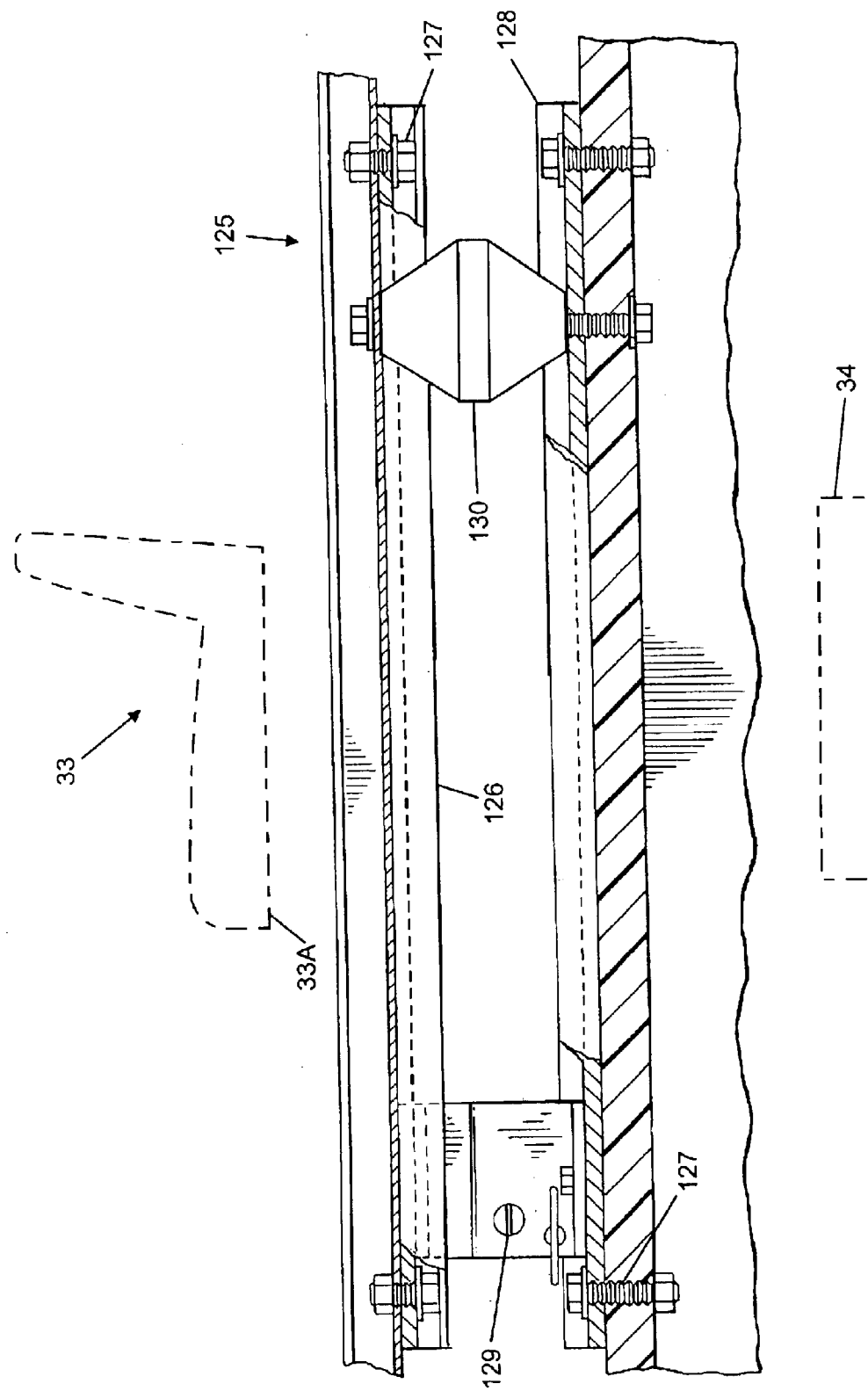
FIG. 8 illustrates application of an isolator to a suspension unit mounted between seat and pedestal.

Referring now to FIG. 8, there is shown another embodiment of the active suspension system of the present invention in the form of an after-market suspension kit 125 which is intended to be mounted between the bottom of a captain's chair or bench and a seat pedestal, column or deck structure. Kit 125 can include a top channel or rail 126 adapted to be mounted to the underside of a captain's seat 33 and the like by fasteners 127. Similarly, a bottom channel or rail 128 is mounted as by fasteners 127 to the top of a conventional pedestal 34 or bench or deck surface or column, etc. In the embodiment illustrated in FIG. 8, a pivot 129 such as a piano hinge, is provided at the common front end of rails 126, 128 which will be positioned at or adjacent the forward edge 33A of captain's seat 33. Other hinge or pivot arrangements can be used and reference can be had to Garelick U.S. Pat. No. 6,042,093 (incorporated by reference herein), and specifically, FIG. 5 thereof, for the details of an acceptable hinge. The Garelick '093 patent shows a similar system but one that is passive in nature. In accordance with the present invention, an active damper referred to hereafter as isolator 130 is mounted by fasteners to top and bottom rails 126, 128 preferably adjacent the rear 33B of captain's seat 33. In the FIG. 9 embodiment, pivot 129 preferably runs the width of top and bottom rails 126, 128 (rail width not shown) and preferably the width of top and bottom rails 126, 128 extends a substantial portion of the width of captain's seat 33. Because isolator 130 is active, it can be permanently fixed to rails 126, 128 without the need for a sliding adjustment, although a sliding adjustment similar to that disclosed in the Garelick '093 patent can be used. In the embodiment of FIG. 8, a single isolator is used in Kit 125. However, two isolators can be utilized spaced width wise apart. Still further, the piano hinge 129 can be replaced by one or more isolators. For example, each corner of top and bottom rails 126, 128 can have an isolator therebetween. The thickness of kit 125 or the height between top and bottom rails 126, 128 in this embodiment is kept to a minimum, preferably 2–6 inches.

Figure 9:
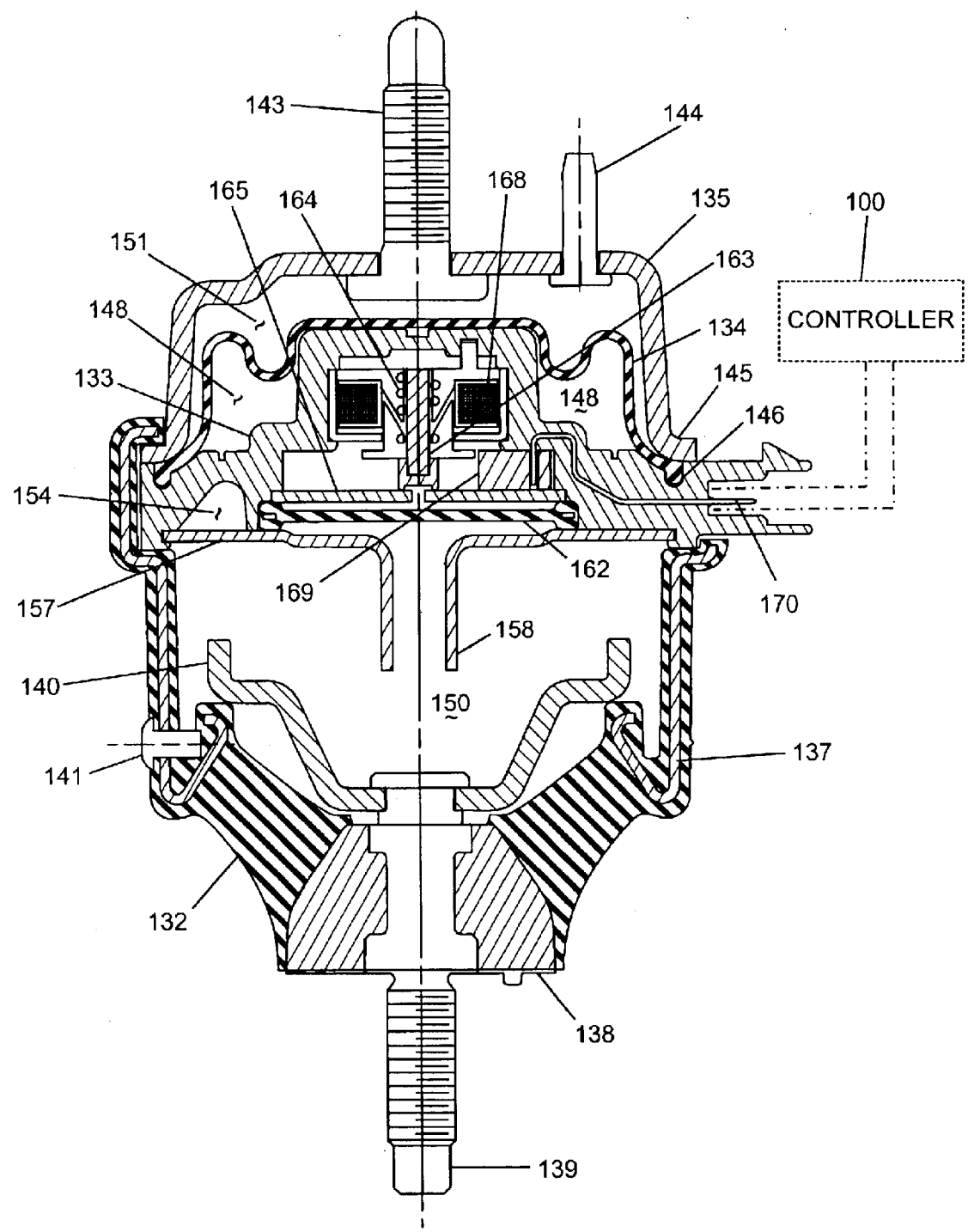
FIG. 9 is a sectioned elevation view of one type of isolator suitable for use in the isolator depicted in FIG. 8.
Figure 10A:
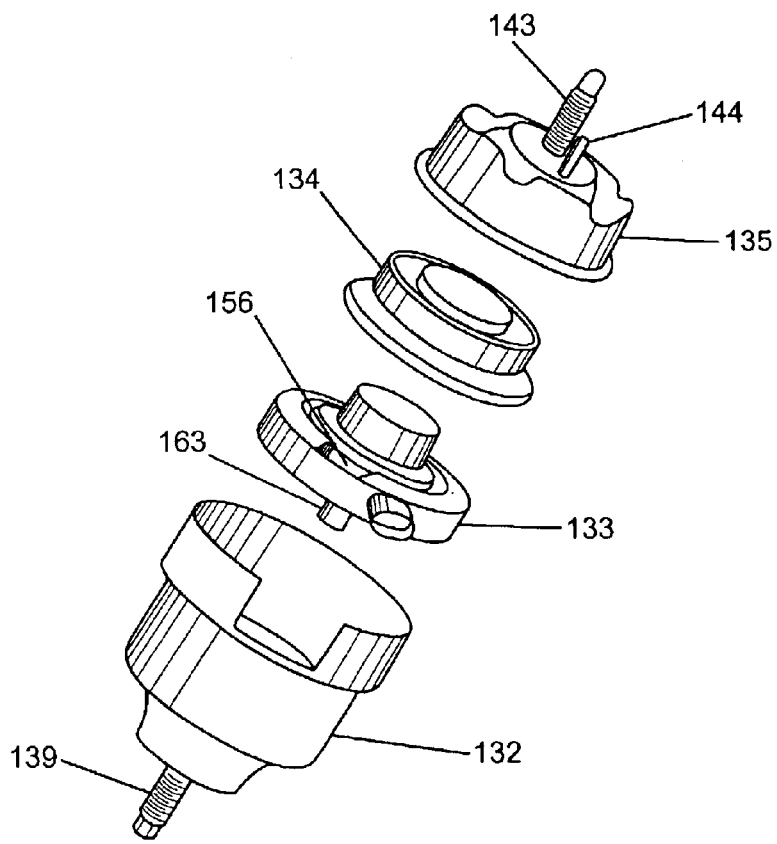
FIG. 10A is an exploded view of the major components of the isolator shown in FIG. 9.
Figure 10B:
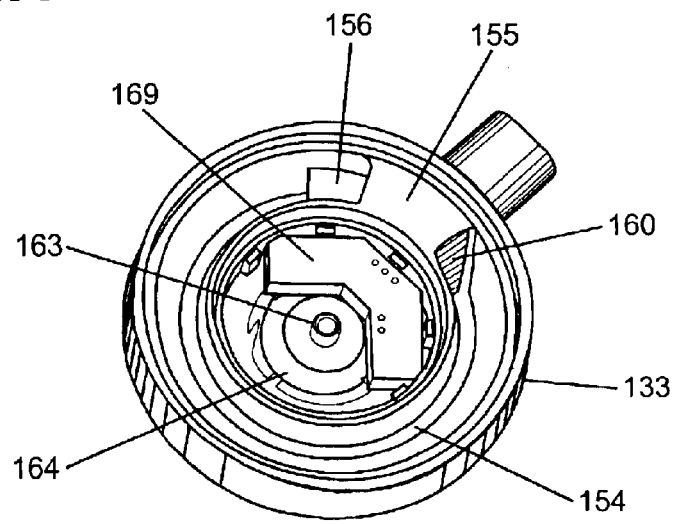
FIG. 10B is a pictorial view of the major components of the isolator shown in FIG. 9.
Figure 11:
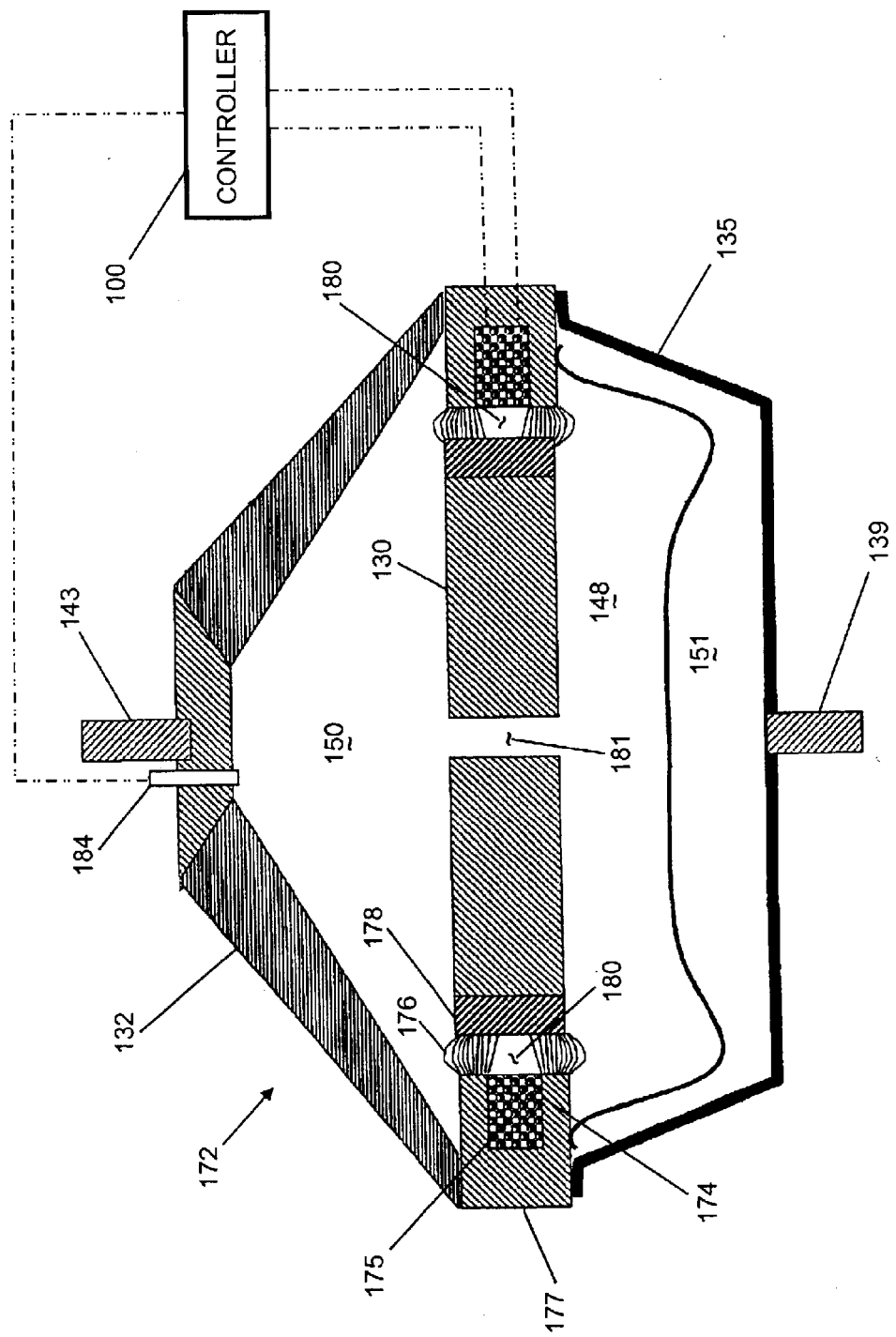
FIG. 11 is a schematic sectioned view of an M-R isolator suitable for use in the arrangement illustrated in FIG. 8; and, FIG. 12 is a schematic representation of the components used to provide an active suspension in the present invention.

Isolator 130 can take at least one of two active damper forms, each of which are conventional. FIGS. 9, 10A and 10B illustrate an active isolator which utilizes conventional hydraulic fluid for damping and FIG. 11 illustrates an M-R isolator.

Referring now to FIGS. 9, 10A and 10B, damper or isolator ("isolator" being used to distinguish the damper of this embodiment in the sense that a piston is not present) includes a cup shaped elastomer body 132, a partition member 133 (metallic), an elastomer diaphragm 134 and a metallic cap 135. Elastomer cup 132 includes an annular, thin spring steel type reinforcing member 137. Also molded to elastomer cup 132 is a generally cylindrical support member 138 to which is mounted an upstanding threaded post type mounting member 139. Within cup body 132 and secured to post assembly 139 is a cup shaped stop member 140. Also shown in FIG. 9 is a rivet type closure member 141 which seals a port within elastomer cup body 132 for charging isolator 130 with hydraulic fluid.

Cap 135 has a threaded post 143 extending therefrom similar to post 139 and a vent tube 144. The bottom of cap 135 is flanged as at 145 to overlie a sealing groove 146 formed in partition member 133. The open end of elastomer cup body 132 is shaped as shown so that reinforcing member 137 can snap over cap flange 145 permitting the peripheral edge of elastomer diaphragm 134 to effectively seal cap 135, partition member 133 and elastomer cup body 132. In the assembled condition, the space within cap 135 between diaphragm 134 and partition member 133 defines a first chamber 148 filled with hydraulic fluid. The space between partition member 133 and cup body 132 defines a second chamber 150 filled with hydraulic fluid. The space within isolator 130 between diaphragm 134 and end cap 135 defines a diaphragm expansion chamber 151.

As best shown in FIG. 10B, the underside of partition member 133 has a circumferentially extending trough 154 formed therein. Trough 154 does not completely circumscribe partition member 133 and starts and stops at a land 155. At adjacent one end of land 155 is a window 156 formed in partition member 133 and providing fluid communication between first and second chambers 148, 150 vis-a-vis trough 154. At the bottom of partition member 133 is a circular diverter disc 157 which has a hollow stem portion 158 opening to second chamber 150. Diverter disk 157 has an opening (not shown) near its peripheral edge which is positioned to overlie trough 154 on the side of land 155 opposite window 156 and adjacent the shaded area designated by reference numeral 160 in FIG. 10B. Thus, a fluid flow path is always established in isolator 130 communicating fluid in second chamber 150 with fluid in first chamber 148 vis-a-vis the opening in diverter disc 157 at one end of trough 154, the trough path itself 154 and finally window 156. When a compressive force is placed on isolator 130, cup body 132 deforms and fluid travels from second chamber 150, along the path described into first chamber 148. When the compressive force is removed, elastomer cup body 132 returns to its original state and fluid travels from first chamber 148 to second chamber 150. Damping occurs as a function of the size of the opening in diverter disc 157, the size of the opening in window 156 and the length of trough 154. Dimensionally, isolator 130 is sized to effectively dampen small vibrations with the orifice/flow path as described. Larger forces require additional flow passages.

To this end isolator 130 is provided with a resilient circular decoupling member 162 which is positioned between partition member 133 and diverter disk 157. A plunger 163 normally biased by a spring 164 pushes against a plunger plate 165 to seal the peripheral edge of decoupling member 162 against diverter disk 157 and partition member 133 so that hydraulic fluid within stem portion 158 of diverter disk 157 cannot enter trough 154. Encircling plunger 163 is a solenoid coil 168 and the leads of solenoid coil 168 are connected through an integral controller 169 to pin terminals 170 which, in turn, are connected to main controller 100. When larger forces are sensed, solenoid coil 168 is energized to retract plunger 163 against the bias of spring 164. Decoupling member 162 no longer establishes a seal and an additional fluid flow path through stem portion 158 to trough 154 is established. An active suspension results because isolator 130 will change from one damping stage to another damping stage when coil 168 is energized. Conceptually, more than two stages of damping is possible should coil technology improve to the point where specific coil forces can be precisely modulated to partially overcome the spring bias to in effect provide for a varying orifice at decoupling member 162. Isolator 130, as described, is conventional.

This invention also contemplates the use of two-stage, solenoid operated active dampers in piston actuated shock absorbers. Reference can be had to U.S. Pat. No. 5,690,195 to Kruckemeyer et al., issued Nov. 25, 1997 and U.S. Pat. No. 5,706,919 to Kruckemeyer et al., issued Jan. 13, 1998. The '195 and '919 patents are incorporated by reference herein for their disclosure of the solenoid, the solenoid actuated shuttle valve and the digressive disk stack valve working in conjunction with the solenoid. The two-stage active dampers operate according to the same principal as that of isolator 130 in that actuation of the solenoid either blocks or opens additional flow passages between first and second chambers thus changing the orifice arrangement of the damper to provide either firm or soft damping characteristics to account for heavy and light loads, respectively, imposed on the damper.

Referring now to FIG. 11, an M-R isolator 172 is schematically depicted and reference numerals used in describing isolator 130 will likewise apply to M-R isolator 172 where applicable. In this embodiment, partition member 130 has a groove 174 formed therein with an electro-magnetic coil 175 disposed within groove 174. Coil 175 is electrically connected as schematically shown to controller 100 to produce an electrical field. Partition member 130 can be formed of a rigid plastic or metal material and a metal flux ring or rim 178 can be positioned adjacent coil 175 with an annular gap 180 therebetween. When coil 175 is energized, an electro-magnetic field 176 extends across and through gap 180. A bleed orifice 181 can also be provided to additionally provide fluid communication between first and second chambers 148, 150 as well as gap 180. Also, for the purpose of this embodiment, there is optionally shown a pressure sensor 184 which senses the pressure of M-R fluid in second chamber 150 and connects to controller 100.

In operation, when minor forces are sensed by sensor 184, coil 175 produces little or no electrical fields and the M-R fluid produces very little shear resistance. As a result, fluid flows proportionally to pressure in response to changes in fluid pressure in second chamber 150 and isolator 172 exhibits relatively soft damping characteristics. When isolator 172 is exposed to an increase in applied force, the increased load results in an increase in pressure of the M-R fluid in second chamber 150 which is detected by sensor 184. This pressure increase triggers controller 100 to increase the current (and thus, the density of the magnetic field in coil 175) and the shear resistance in the M-R fluid is increased. It is to be understood that current may be provided in an amount proportional to the sensed pressure value so that the movement of the fluid is resisted proportionally with the current and resulting flux density 176 created by coil 175. Thus, the resistance to movement of M-R isolator 172 is continuously infinitely variable so as to match the external forces applied to the watercraft's hull. Reference can be had to assignee's United States patent publication No. US 2002/0153647A1, published Oct. 24, 2002 (which is incorporated by reference herein), for a more detailed explanation of the operation of M-R isolator 172 than that set forth herein.

Figure 12:
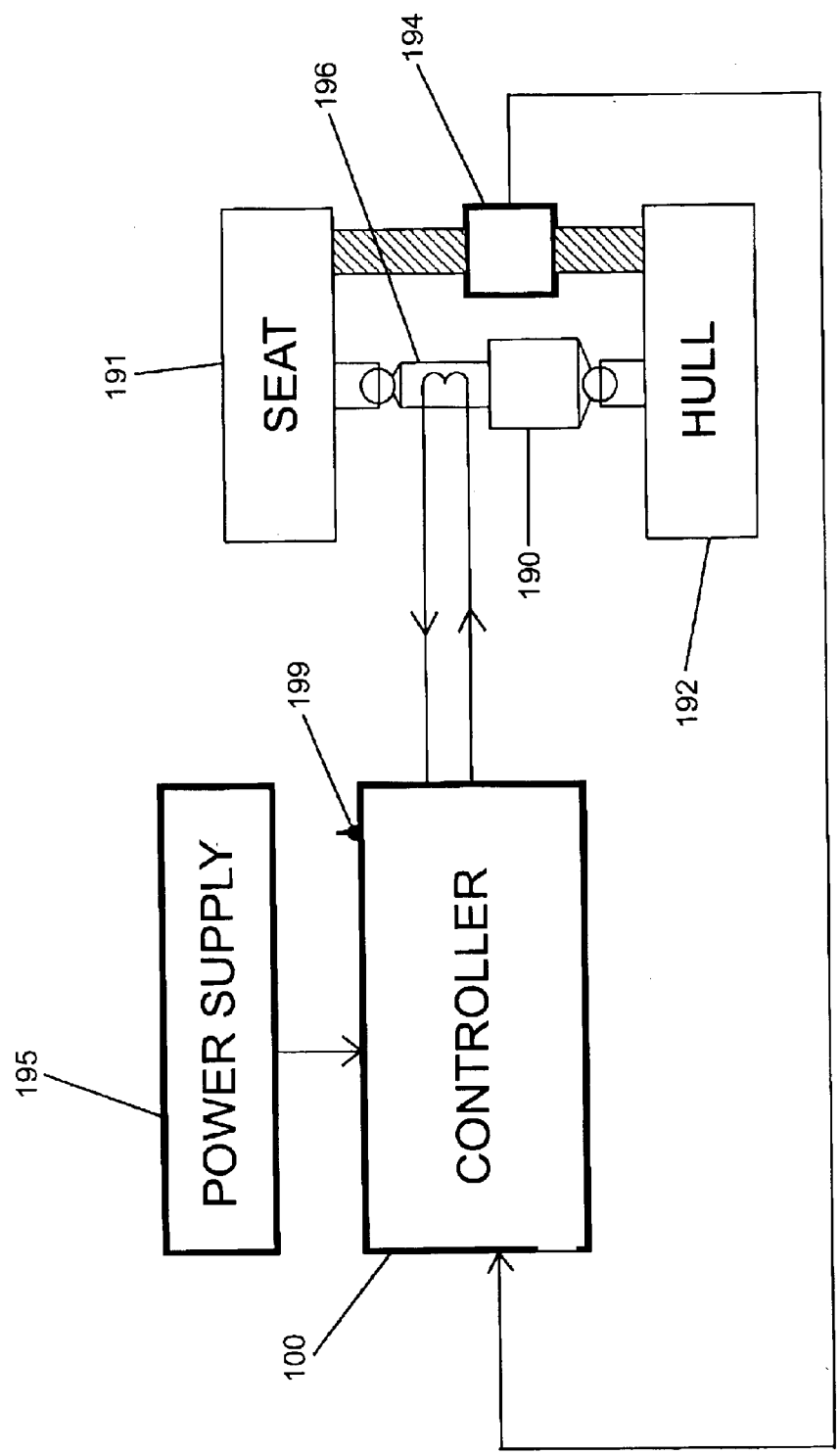

Referring now to FIG. 12, there is shown a schematic representation of the inventive system described above. An active damper 190 is mounted directly or indirectly between an occupant's seat 191 and the hull 192 of a watercraft. Active damper 190 may take the form of an M-R piston type shock absorber such as the M-R monotube shock 44 described with reference to FIG. 5, or the M-R twin tube damper 101 described with reference to FIG. 7, or any other conventional M-R piston actuated damper. Alternatively, active damper 190 can comprise an M-R damper of the isolator type such as isolator 172 described with reference to FIG. 11. Alternatively, active damper 190 can comprise a two or multi-stage conventional damper filled with conventional hydraulic fluid such as described with reference to isolator 130 as shown in FIGS. 9, 10A and 10B or a two-stage, solenoid actuated piston damper can be utilized.

A basic objective of the system is to variably dampen the relative motion between seat 191 and hull 192 and this motion results from an applied force to seat 191. For example, a spring 45 or 119 or an elastomer 132 provides a biasing force resisting compression of the damper. Accordingly, motion of seat 191 relative to hull 192 can be correlated to the spring force and the sprung mass imparted by or to the occupant of seat 191. Thus, in a broad sense the invention utilizes any conventional sensor 194 that senses a physical attribute of the applied seat force to generate a signal (conventionally, an electrical signal), indicative of the current motion of the seat which can then be used to variably control damping of the seat. For example, pressure sensor 184 senses the seat force by measuring the pressure of the fluid in the chamber and the pressure signal and change thereof can be correlated to a desired damping force. Conceptually, a load cell between seat and pedestal provides the same type of signal. However, because the motion of the seat is to be damped, the preferred sensor is any sensor that directly measures the movement of the seat. Accordingly, sensor 194 can be a conventional position sensor 52, 53 as shown in FIG. 4 or alternatively, a velocity or acceleration sensor 121 as indicated in FIG. 7. It is to be appreciated that position sensors 52, 53 or velocity or acceleration sensor 121 are conventional items and are supplied with electronics such as a Humphrey box, which form part of controller 100. For example, a position sensor will indicate the relative position of seat 191 to hull 192 and controller 100 is equipped with an appropriate clock circuit which converts the position signal to a signal indicative of the rate change or acceleration of seat 191. The velocity sensor signal could similarly be converted to an acceleration signal and an acceleration sensor is supplied with its own appropriate clock circuitry to give a direct read out of the seat acceleration. In practice, the sensor choice is dictated by economics and most likely will result in use of a position sensor which provide a cost effective way to provide variable control for both rebound and compression of the damper.

Preferably, sensor 194 is mounted on the seat structure or on the damper as illustrated in the embodiments discussed above. However, other mounting arrangements will suggest themselves to those skilled in the art. When multiple dampers are used, such as in the embodiments depicted in FIG. 2 or FIG. 8, one centrally mounted sensor can be employed which will result in the uniform control of all active dampers in the suspension assembly. Alternatively, the central sensor can also be equipped with a sensor measuring lateral seat force direction and controller 100 will vary the resistance of the dampers on an individual basis to account for the lateral force. Alternatively, and somewhat preferred, is to provide each damper with its own sensor to provide a more stable suspension, although this is not necessary.

Controller 100 receives the sensor signal as shown and is powered by a power supply 195 which is typically the battery in the watercraft. Controller 100 can be any electrically controlled device which provides the capability of altering the ability of the damper to resist movement. Typically, for M-R dampers, controller 100 is a microprocessor or an intelligent circuit board. However, for the two-stage solenoid embodiments an unintelligent board, such as one utilizing ASIC circuits can be employed. The two-stage embodiments simply switch on and off current to coil 196 in active damper 190. A sensor signal of a set magnitude is set to trigger actuation of current to coil 196 by controller 100 by any conventional circuit arrangement.

For continuously variable M-R damper applications, a more sophisticated control is required. For such applications, the watercraft will utilize the algorithms developed in the controllers regulating automotive M-R dampers. These known algorithms interpolate the sensor signal and generate an electrical voltage or current applied as an actuating signal to coil 196 which develops a desired magnetic field controlling the apparent or effective viscosity of M-R fluid through the gap as described above. Typically, controller 100 generates the actuating signal as a specific current waveform having trailing and leading edges especially shaped to produce the desired magnetic flux configuration within the gap. As is well known, amplitude and/or frequency of the waveform is then changed in accordance with the interpolated sensor signal. For example, amplitude of the actuating signal waveform is proportional to the sensed seat acceleration. As the acceleration increases, amplitude of actuating signal proportionately increases resulting in a proportional increase of the magnetic field in the gap and a proportional increase in the apparent viscosity of M-R fluid traveling through the gap. The proportionality can simply be established as a constant. However, look-up tables can be used to establish any set amplitude for a sensed motion to produce any desired damping resistance curve.

Controller 100 may be optionally provided with a user actuated switch 199 which can override the automatic functioning of controller 100. In the two-stage damper embodiment, switch 199 permanently actuates or de-actuates coil 196. In the M-R embodiment, the switch can simply set the initial waveform, at any one of several desired settings, and controller 100 simply inputs the waveform as a constant. For example, the user may initially set or calibrate the waveform in a "soft," "firm" or "firmer" mode and controller 100 will input the waveform at constant amplitudes corresponding to the "soft," "firm" and "firmer" settings. Alternatively, more sophisticated routines can be employed. For example, controller 100 can continue to interpolate the sensor signal to develop a proportional amplitude for the actuating signal waveform normally applied to coil 196. However, the amplitude of the "normal" actuating signal can be compared to the amplitude of the user set "fixed" amplitude signal and override the user set "fixed" amplitude only if greater. This type of routine assures that the active damper will provide the desired damper resistance (and boater safety) if the hull comes into contact with waves generating rapid accelerations and the control was set to a "soft" or "firm" mode. Still further, amplitude look-up tables correlating amplitude signal strength to sensed motion can be developed for the "soft," "firm" and "firmer" user settings as well as for the automatic "normal" setting. Actuation of switch 199 simply activates the desired look-up table.

The invention has been described with reference to preferred and alternative embodiments. Obviously, alterations and modifications will occur to those skilled in the art upon reading and understanding the Detailed Description of the Invention set forth herein. It is intended to cover all such modifications and alterations insofar as they come within the scope of the present invention.

Having thus defined the invention, it is claimed:

1. A seat suspension system for watercraft having a seat for carrying an occupant of the watercraft and hull structure in contact with water and to which said seat is attached, said suspension system comprising:
 a) a first support connected to said seat;
 b) a second support connected to said hull structure;
 c) a fluid damper mounted between said first and second supports, said damper having a first chamber with fluid adjacent said first support, a second chamber with fluid adjacent said second support, a dividing member between said chambers having a gap providing fluid communication between said chambers, and electrically actuated means adjacent said gap for controlling fluid flow from one chamber to the other through said gap, wherein said electrically actuated means includes a plunger movable from a first position whereat said gap is open to a second position whereat said gap is closed, said dividing member further having an additional opening providing fluid communication between said chambers, and said electrically actuated means including a solenoid for moving said plunger when actuated from one of said positions to the other position;
 d) spring means operatively connected to the fluid damper for biasing said first support relative to said second support;
 e) a sensor for detecting motion of said seat and generating a sensor signal indicative of said motion; and,
 f) a control unit connected to said sensor and to said electrically actuated means for generating a set control signal in response to said sensor signal causing said electrically actuated mechanism to control fluid flow through said gap whereby an active seat suspension damper cushions watercraft forces imposed on said seat occupant.

2. The seat suspension of claim 1 wherein said electrically actuated means includes a coil generating a magnetic field in and through said gap in response to current flowing through said coil and said fluid is a magneto-rheological fluid.

3. The seat suspension of claim 2 wherein said control signal is a current or voltage having a waveform of set configuration determined as a function of said sensor signal.

4. The seat suspension system of claim 1 wherein said damper is a suspension strut having a spring base affixed to its outer tube and the spring means comprises a spring compressed between said spring base and said first support.

5. The seat suspension system of claim 4 wherein said strut damper has an inner tube mounted to said first support and said outer tube mounted to said hull.

6. The seat suspension of claim 1 wherein said damper further includes a closed end tubular member connected at one of its ends to one of said supports; said dividing member includes a piston movable within said tubular member and a piston rod connected to said piston and extending through the other one of said tubular ends, said piston rod connected to the other one of said supports.

7. The seat suspension system of claim 6 wherein said first support is a first cylinder connected to said seat and said second support is a second cylinder connected to said hull structure and one of said cylinders telescopes into and out of the other cylinder.

8. The seat suspension of claim 1 wherein said first support has a pivot at one end and a mount at its opposite end for attachment to said damper.

9. The seat suspension system of claim 1 wherein said second support includes a pedestal mounted to said hull structure and a bottom support plate mounted to said pedestal and said first support includes a top support plate and a seat mounted to said top plate.

10. The seat suspension system of claim 9 further including a first damper adjacent one end of said support plates and a second damper adjacent the opposite end of said support plates.

11. The seat assembly of claim 9 further including a pivot at one common end of each support plate whereby the top support plate rotates relative to said bottom support plate and said damper positioned between said support plates adjacent the opposite common ends of said support plates.

12. The seat suspension of claim 9 wherein said damper is an isolator having an elastomer body portion with a first fastener post extending therefrom; a rigid body portion with a second fastener post extending therefrom; a partition member between said body portions dividing the inside of said isolator into said first chamber on one side of said partition member and said second chamber on the opposite side of said partition member; a diaphragm in said first chamber dividing the space in said first chamber between said partition member and said diaphragm into a sealed first chamber and the space in said first chamber between said diaphragm and its associated body portion into a vented first chamber; said partition member having an opening therethrough providing additional fluid communication between said first sealed chamber and said second chamber; and damper fluid in said second and first sealed chambers.

13. The seat suspension of claim 12 wherein said electrically actuated means includes a solenoid coil and a plunger movable when said coil is energized from a first position closing or opening said gap to a second position opening or closing said gap, respectively, and said damper fluid being hydraulic fluid.

14. The seat suspension of claim 12 wherein said electrically actuated means includes said gap being generally annular within said partition member, an electrical coil circumscribing said gap on one side thereof, a circular flux ring circumscribing said gap on the other side thereof and said damper fluid being M-R fluid.

15. The suspension system of claim 1 wherein said sensor measures a physical characteristic resulting from a force applied to said seat resulting in motion to said seat selected from the group consisting of a) positional change, b) velocity, c) acceleration, d) pressure and e) load or spring mass.

16. An active seat suspension system for watercrafts having a seat for carrying an occupant of the watercraft and hull structure in contact with water and to which said seat is affixed, said suspension system comprising:
 a) a first support connected to said seat;
 b) a second support connected to said hull structure;
 c) a fluid damper mounted between and to said first and second supports, said damper having a first chamber adjacent said first support, a second chamber adjacent said second support, an intermediate member having a gap between said first and second chambers, a solenoid coil and a plunger movable when said coil is energized to open or close said gap;
 d) a sensor for measuring a physical property resulting from a force imposed on said seat and generating a sensor signal indicative of the motion of said seat;
 e) a power supply; and,
 f) a control unit connected to said power supply, said sensor and said coil developing a control signal for energizing said coil in response to measurements detected by said sensor to variably control damping of said seat in response to motion of the watercraft and forces imparted to the hull of said watercraft by water.

17. The suspension of claim 16 wherein said physical property is selected from one or more of the group consisting of a) position, b) velocity, c) acceleration, d) pressure, and e) mass or weight.

18. An active watercraft seat suspension system comprising:
 a) a sensor generating a sensor signal indicative of motion of a watercraft seat;
 b) a damper connected between a hull of said watercraft and said seat, said damper having a control device therein responsive to an actuating signal for controlling the resistance of said damper, wherein said damper has an internal dividing member dividing the interior of said damper into a first sealed chamber on one side of said member and a second sealed chamber on the opposite side of said member, said member having a gap providing fluid communication between said first and second chambers, and said control device in said damper includes a solenoid coil and a plunger movable in response to said actuating signal from a first position sealing said gap to a second position whereat said gap is not sealed;
 c) spring means disposed about the fluid damper and operatively connected to the fluid damper for biasing said first support relative to said second support; and,
 d) a control unit electrically connected to said sensor and adapted to generate said actuating signal in response to said sensor signal.

19. The seat suspension of claim 18 wherein said damper has an elastomer portion and said member is a partition member.

20. The seat suspension of claim 18 wherein said damper includes a cylindrical tube and said member includes a piston sealingly slidable in said tube.

21. The seat suspension of claim 18 wherein said damper has an internal dividing member dividing the interior of said damper into a first sealed chamber on one side of said member and a second sealed chamber on the opposite side of said member; each sealed chamber having magneto-rheological fluid disposed therein; said member having a gap providing fluid communication between said first and second chamber; and said control device includes a conductor coil on one side of said gap and a flux ring on the opposite side of said gap for generating a magnetic field within said gap in response to said actuating signal controlling the apparent viscosity of said fluid passing through said gap.

22. The seat suspension of claim 21 wherein said damper has an elastomer body portion; said interior member includes a partition member; said gap is an annular opening extending through said partition member, said coil is formed as a ring circumscribing one peripheral edge of said annular opening and said flux ring circumscribes the opposite peripheral edge of said annular opening.

23. The seat suspension of claim 21 wherein said member includes a piston, said flux ring movable with said piston, and said gap defined as an annular opening between said piston and said flux ring.

* * * * *